Aug. 29, 1967　　　J. M. WARNER　　　3,338,067
COMBINED BEVERAGE AND REFRIGERANT CONTAINERS
Filed June 28, 1966　　　2 Sheets-Sheet 1

INVENTOR.
JOHN M. WARNER
BY
Paul & Paul
ATTORNEYS.

Aug. 29, 1967 J. M. WARNER 3,338,067
COMBINED BEVERAGE AND REFRIGERANT CONTAINERS
Filed June 28, 1966 2 Sheets-Sheet 2

INVENTOR.
JOHN M. WARNER
BY
Paul & Paul
ATTORNEYS.

United States Patent Office 3,338,067
Patented Aug. 29, 1967

3,338,067
COMBINED BEVERAGE AND REFRIGERANT CONTAINERS
John M. Warner, 603 W. Hartwell Lane, Philadelphia, Pa. 19118
Filed June 28, 1966, Ser. No. 561,247
9 Claims. (Cl. 62—264)

ABSTRACT OF THE DISCLOSURE

A beverage container with a large female threaded socket formed in the bottom of the container, and a barb protruding from the bottom of the socket outwardly toward the end of the container. A refrigerant container having a protruding portion with a large male thread thereon. The beverage container is threaded onto the refrigerant container to a point where the barb punctures the refrigerant container and then the refrigerant container is backed off and the refrigerant escapes and expands through passages formed between the threaded portions of the containers, thereby cooling the beverage.

Background of the invention

This invention relates to a combined beverage container and refrigerant container having particular utility as a self-cooling combination wherein, by simple manipulation, the contents of the refrigerant container may be utilized for the purpose of cooling the contents of the beverage container.

A combination according to this invention is particularly useful where no convenient power source is available for refrigerating the beverage in its container. Picnickers, golfers, campers and others who participate in outdoor activities have a particular need for a small, portable beverage container which is light in weight and which is associated with an automatic means for cooling the beverage for immediate use.

It is an object of this invention to provide a self-cooling combination of the type indicated above, and having the advantages of low cost, portability, and ease and convenience of use.

Other objects and advantages of this invention will further become apparent hereinafter and in the drawings whereof:

Figure 4:
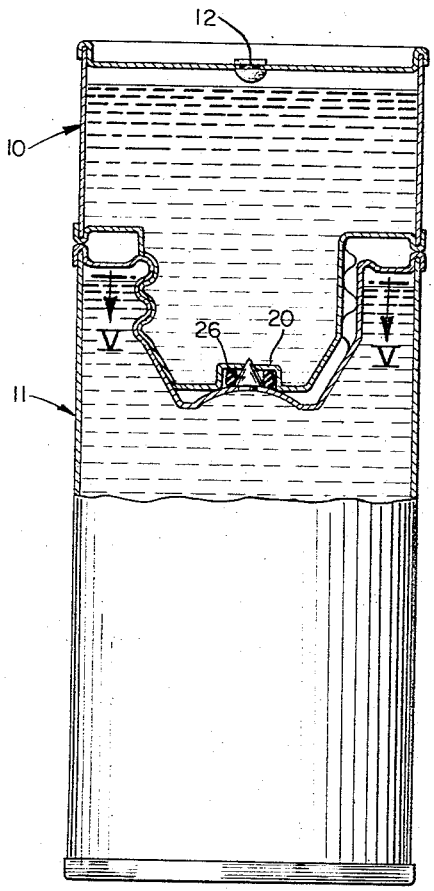
FIG. 4 is a view similar to FIG. 1, showing a modification including a resealing gasket, and showing the beverage container and refrigerant container assembled.
Figure 6:
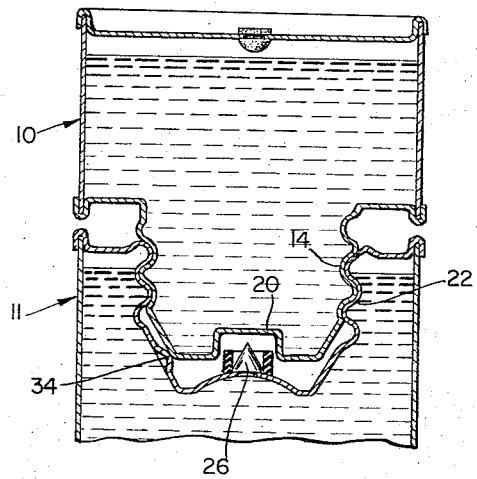
Figure 7:
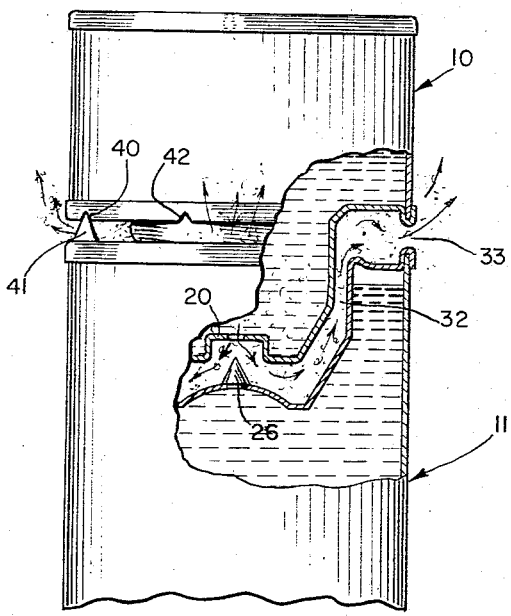

FIG. 6 is a sectional view of the upper portion of the assembled containers, similar to FIG. 4, but showing the refrigerant container slightly withdrawn from the beverage container; and FIG. 7 is a view in side elevation, partly broken away and shown in section, of an upper portion of the combined refrigerant container and beverage container, illustrating the manner in which cooling is effected in accordance with this invention.

Turning now to the specific forms of the invention selected for illustration in the drawings, the number 10 designates the refrigerant container and the number 11 designates the beverage container. The refrigerant container 10 is filled with a fluid refrigerant such as "Freon," for example, usually contained under pressure and in liquid form. The number 12 designates a (rubber) plug which serves to seal the pressure container 10 after it has been filled with refrigerant.

At its lower, central portion the refrigerant container 10 has a downwardly extending protrusion 13 which, as shown, is provided with a plurality of generally helically arranged threads 14. The lower part of protrusion 13 has an inwardly directed conical portion 15 and is provided with a base 16 having an upwardly extending recess 17 provided with a generally horizontal, frangible disc 20.

The upper end of container 11 is provided with a socket portion 21 provided with threads 22 which correspond to the threads 14. Socket 21 has, at its lower end, a conical portion 23 which corresponds to the conical portion 15. The socket portion 21 has a base 24 with an upwardly arched central portion 25 having a conical needle 26 having a sharp, pointed end.

Figure 2:
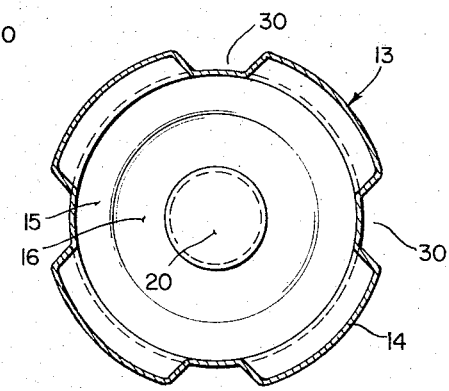
FIGS. 2 and 3 are sectional views taken as indicated by the lines and arrows II—II and III—III respectively, which appear in FIG. 1.

As appears in FIG. 2, each of the threads 14 is interrupted by a plurality of vent channels 30 which run across the threads, for a purpose to be disclosed in further detail hereinafter.

Figure 3:
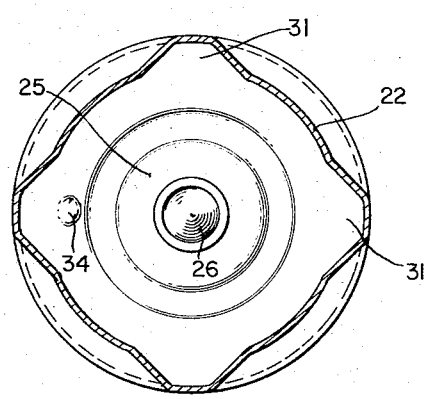
Figure 5:
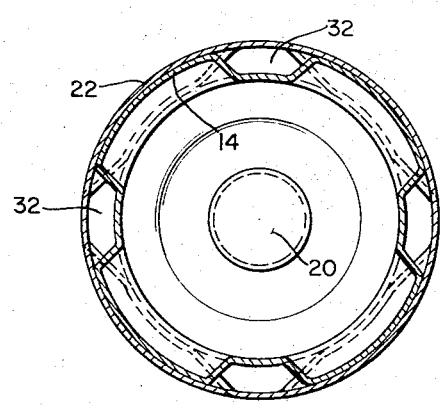
FIG. 5 is a sectional view taken as indicated by the lines and arrows V—V appearing in FIG. 4.

Referring to FIG. 3, the threads 22 have indented portions 31 which combine, in the manner illustrated in FIG. 5, with the indented portions 30 in order to provide vent openings 32, for a purpose to be explained in detail hereinafter.

Figure 1:
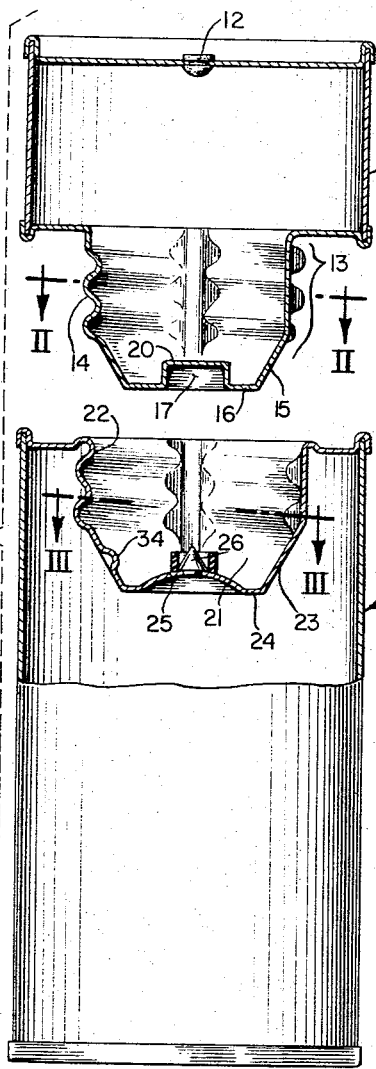
FIG. 1 is a view in side elevation, with portions broken away and shown in section in order to reveal important details, showing a beverage container and refrigerant container in adjacent positions but unconnected to one another.

As shown in FIGS. 1 and 3, a collapsible dimple 34 is provided in the socket and extends between the socket and the protrusion 13 to provide a collapsible stop. This dimpled portion 34 is located to stop the movement of the refrigerant container protrusion 13 into the socket 21 for purposes of storage, as will be explained in further detail hereinafter.

FIG. 6 shows the refrigerant container 10 and the beverage container 11 in predetermined relative positions having best advantage for storage prior to use. The threads 14 are screwed into the threads 22 until the lower conical portion 15 comes into contact with the collapsible dimple portion 34. At this point, the frangible disc 20 is spaced slightly above the point of needle 26.

By exertion of considerable manual force, by twisting the refrigerant container 10 clockwise with respect to the beverage container 11, dimple 34 can be collapsed and the refrigerant container 10 screwed down to the position illustrated in FIG. 4. In this position it will be apparent that the needle 26 has penetrated the frangible disc 20. Although some refrigerant tends to vaporize, and to be expelled through the hole created by the needle 26, the amount thus liberated is very small and may even be substantially zero, depending upon the nature of the material used for the frangible disc 20.

In order to liberate the vaporizing refrigerant at a controllable speed, the refrigerant container 10 is turned slightly counter-clockwise from the position illustrated in FIG. 4, reaching the position illustrated in FIG. 7. It will be observed that the refrigerant is then free to vaporize and to be expelled through the vent spaces 32 and out to the atmosphere, through the opening 33 between the containers. The velocity with which the refrigerant is vaporized and expelled can be controlled by simple manual twisting of one container with respect to the other.

In order to assist the proper determination of the amount of twisting that is desirable in a specific case, indentations may be provided as shown in FIG. 7. An indentation 40 may be provided in the upper container 10 which contains refrigerant, and an upwardly extending wedge 41 is provided in a manner to extend upwardly from the top of beverage container 11. The length of wedge 41 is carefully controlled so that, although it can enter into the indentation 40, the stop effect thus achieved can be overpowered manually. Spaced from the indentation 40 is another indentation 42, which cooperates in a similar manner with the wedge 41, the threads in the threaded connection being sufficiently loose to allow leeway for the operation of wedge 41 in both indentations 40 and 42. Suitable designations may be inscribed on the refrigerant container 10, such as "vent" for the indentation 40 and "cool" for the indentation 42, or any other suitable inscription as desired.

The operation of the combination of containers will now be apparent. The beverage containers are manufactured and filled in the usual manner, as are the refrigerant containers 10. In practice, they are preferably assembled by inserting the protrusion 13 into the socket 21 and turning the refrigerant container 10 clockwise until dimple 34 is struck by the lower conical portion 15. This provides a stop position which is preferably augmented by the stopping effect of the wedge 41 and the indentation 40. In this condition, the combination may readily be stored, shipped and carried about by the ultimate user. In order to cool the contents of the beverage container 11, the user merely twists the refrigerant container 10 clockwise with respect to the beverage container 11, collapsing the dimple 34 and overpowering the effect of wedge 41 and indentation 40, until wedge 41 comes into registry with indentation 42. At this point, needle 26 has punctured the frangible disc 20. Then, the user turns refrigerant container 10 counter-clockwise, back to the point where wedge 41 registers with indentation 40, and the refrigerant vaporizes and flows out through the vent passages 32, cooling the contents of the beverage container 11 by conduction through the metal wall of the socket portion 21 and the upper wall of the beverage container.

The provision of the vent structure not only provides for positive venting of the vaporized refrigerant but also provides an enhanced area for heat transfer at the upper end of the beverage container 11.

It will be appreciated that variations may be made in the apparatus shown and described without departing from the scope of the invention. For example, various means may be used for filling the refrigerant container with refrigerant, and for sealing the refrigerant container once it has been filled. Further, it is not always necessary to provide mating threaded connections between the protuberance and the socket, since the two containers may be joined by other means which permit a relative vertical movement in order to provide for the deliberate and controlled release of the refrigerant.

When a threaded connection is used, it is sometimes possible to provide much smaller vent passages, perhaps even to eliminate any vent passages, by providing a suitable loose fit between the threads.

It will also be appreciated that various equivalent elements may be substituted for those specifically shown and described, that parts may be reversed, and that certain features may be used independently of the use of other features, all without departing from the spirit and scope of this invention as defined in the appended claims.

It will be understood that the "Abstract of the Disclosure" is intended to provide a non-legal technical statement of the contents of the disclosure as illustrated by the preferred embodiment in compliance with the Rules of Practice in the United States Patent Office, and is not intended to limit the scope of the invention described and claimed.

The following is claimed:

1. The combination of a beverage container and a refrigerant container containing a pressurized refrigerant, wherein the beverage container and the refrigerant container have mating means thereon for physically positioning said containers with respect to one another; releasing means disposed on said containers operative when said containers are mated to a predetermined position to release said refrigerant; said mating means forming therebetween a flow path to the atmosphere for said released refrigerant, whereby heat exchange occurs between said released refrigerant and said beverage container along said flow path.

2. The combination defined in claim 1 wherein said mating means comprises a socket and a mating protrusion which are threaded.

3. The combination defined in claim 2 wherein vent channels disposed across said threads to vent the released refrigerant to the atmosphere.

4. The combination defined in claim 1 wherein said releasing means comprising a pointed member arranged to puncture a portion of said refrigerant container in response to a predetermined relative movement of said refrigerant container and said beverage container.

5. The combination defined in claim 1 wherein resealing means disposed between said containers and in contact therewith, operative in response to actuation of said mating means in a direction opposite to the releasing actuation.

6. The combination defined in claim 4 wherein indicator means disposed on the outside surface of at least one of said containers to indicate the relative positions when said containers are in an unpunctured storage position and in a position to puncture said refrigerant container, and in a venting position.

7. The combination defined in claim 2 wherein a dimple portion adjacent said threaded portions extends between said socket and protrusion to provide a collapsible stop, said dimpled portion being located to stop the movement of said refrigerant container protrusion into said socket just before said fluid releasing means becomes operative.

8. For use with a refrigerant container containing a pressurized refrigerant, a beverage container having a mating means adapted to be connected to a corresponding mating means on the refrigerant container for physically positioning said beverage container with respect to said refrigerant container, and releasing means operative when said containers are mated to a predetermined position as to release said refrigerant; said respective mating means forming a flow path therebetween to the atmosphere for said released refrigerant, whereby heat exchange occurs between said released refrigerant and said beverage container along said flow path to cool said beverage container.

9. For use with a beverage container having a releasing means for releasing refrigerant and having a mating means thereon, a refrigerant container having a corresponding mating means for physically positioning said refrigerant container with respect to said beverage container, said releasing means being operative when said containers are mated to a predetermined position to release said refrigerant; said respective mating means forming therebetween a flow path to the atmosphere for said released refrigerant, whereby heat exchange occurs between said released refrigerant and said beverage container along said flow path.

References Cited

UNITED STATES PATENTS

| | | | |
|---|---|---|---|
| 2,536,001 | 12/1950 | Chase | 62—294 X |
| 2,898,747 | 8/1959 | Wales | 62—294 |
| 3,269,141 | 8/1966 | Weiss | 62—294 |

ROBERT A. O'LEARY, Primary Examiner.

W. E. WAYNER, Assistant Examiner.